UNITED STATES PATENT OFFICE.

HARRY S. MORK, OF BROOKLINE, MASSACHUSETTS, ASSIGNOR, BY MESNE ASSIGNMENTS, TO AMERICAN LA FRANCE FIRE ENGINE COMPANY, INC., OF ELMIRA, NEW YORK, A CORPORATION OF NEW YORK.

FIRE-EXTINGUISHER COMPOSITION.

1,278,716.   Specification of Letters Patent.   Patented Sept. 10, 1918.

No Drawing.   Application filed January 14, 1918.   Serial No. 211,833.

*To all whom it may concern:*

Be it known that I, HARRY S. MORK, a citizen of the United States, residing at Brookline, county of Norfolk, State of Massachusetts, have invented a certain new and useful Fire-Extinguisher Composition, of which the following is a specification.

My invention relates to fire extinguisher charges and more particularly to the carbonate solution from which carbon dioxid for expelling the extinguishing medium is generated by reaction with a suitable acid. Alkali metal salts of carbonic acid, either in the form of bicarbonate or in the form of the normal carbonate have been commonly employed for such solutions, while sulfuric acid or hydrochloric acid has usually been employed as the acid charge. In order that the carbonate solution may always remain in a condition suitable for use even when exposed to low temperatures, it has been proposed to incorporate in the carbonate solution, an ingredient for lowering the freezing point thereof. Most of those ingredients which have been heretofore proposed for this purpose are subject to one disadvantage or another. In some instances, the addition agent tends to give rise to the formation of a precipitate of insoluble carbonate or other salt or to retard the generation or evolution of the carbon dioxid gas; or its effect in small quantities has not been sufficiently marked in depressing the freezing point.

The object of my invention is to produce a carbonate solution charge of the desired low freezing point which shall be free from the disadvantages above noted. At the same time, the invention seeks to avoid the use of ingredients which might involve undue expense, or which would in any way interfere with the fire extinguishing qualities of the medium which is to be ejected from the apparatus.

The carbonate solution embraced by the present invention, comprises as essential ingredients, an alkali metal salt of carbonic acid, preferably sodium bicarbonate, and an alkali metal citrate, especially potassium citrate. To clearly illustrate the principles involved and to enable those skilled in this art to understand and practice the invention, I may refer to a specific example in which the solution comprises sodium bicarbonate and potassium citrate crystals in substantially the proportions of 5.53 grams of sodium bicarbonate and 107 grams of potassium citrate crystals in 100 cubic centimeters of water. Such a solution has a freezing point close to —50° F. and remains quite fluid with considerable drop in temperature, becoming pasty at about —30° F. It is in all respects well adapted to serve as a fire extinguisher charge, although the capacity of the solution for developing carbon dioxid gas, when treated with acid, is somewhat reduced, due to the presence of the citrate.

In place of sodium bicarbonate, I may employ potassium carbonate with the potassium citrate, in which event, the solution would comprise these essential ingredients, for example in the following proportions: 4.54 grams of potassium carbonate and 115 grams of potassium citrate crystals in 100 cubic centimeters of water. This solution shows a freezing point of approximately —54° F., crystals, however, being separated at —20° F., or at about that temperature.

Similar solutions may be made up for example of 4.54 grams potassium carbonate with 91 grams of sodium citrate; 6.6 grams of potassium bicarbonate with 105.9 grams potassium citrate; or 5.21 grams ammonium bicarbonate with 106.5 grams potassium citrate. These proportions assume the presence of 100 c. c. of water, and are intended to be only illustrative of the general principles involved. It is to be noted that the capacity of the potassium carbonate solution for setting free carbon dioxid gas, when treated with acid, appears to be somewhat improved by the presence of the sodium citrate in the example given.

The carbonate solution embodied by the present invention is adapted to be employed in the usual manner as a charge for fire extinguishers, wherein it is acted upon by a suitable acid for developing the carbon dioxid gas by which the fluid is expelled upon the fire.

I claim:

1. A carbonate solution for fire extinguishers, comprising as essential ingredients, an alkali metal salt of carbonic acid, and an alkali metal citrate.

2. A carbonate solution for fire extinguishers, comprising as essential ingredients, sodium bicarbonate and an alkali metal citrate.

3. A carbonate solution for fire extinguishers, comprising as essential ingredients, an alkali metal salt of carbonic acid, and potassium citrate.

4. A carbonate solution for fire extinguishers, comprising as essential ingredients, sodium bicarbonate and potassium citrate.

5. A carbonate solution for fire extinguishers, comprising as essential ingredients, sodium bicarbonate and potassium citrate, substantially in the proportions of 5.53 grams of sodium bicarbonate and 107 grams of potassium citrate in 100 cubic centimeters of water.

HARRY S. MORK.